C. ST. JOHN.
Lamp Shade.
No. 3,458. Reissued May 25, 1869.
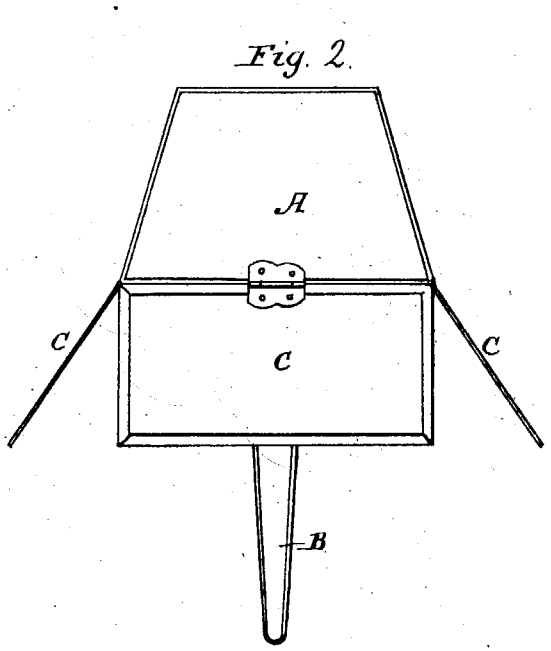
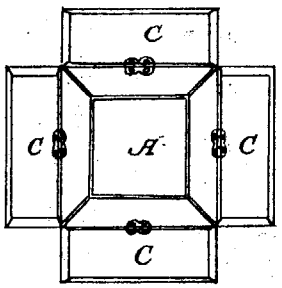
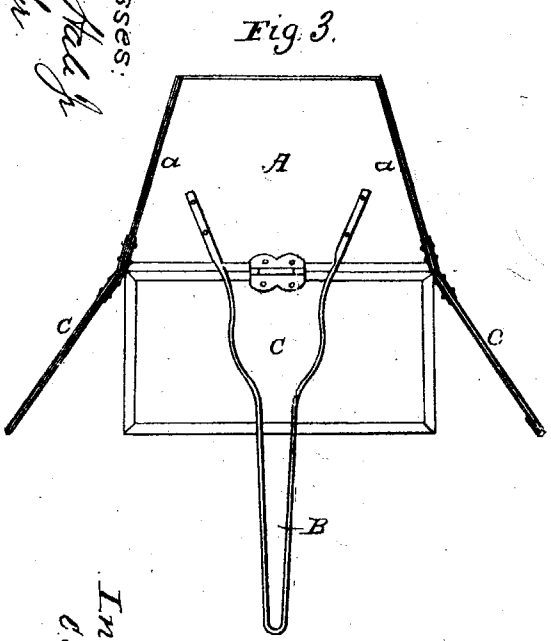
Witnesses:
J. P. Hale Jr
H. E. Fisher
Inventor:
C. St. John
by his attorney
R. Holden

United States Patent Office.

CARLOS B. CURTISS, OF BRIDGEPORT, CONNECTICUT, ASSIGNEE, BY MESNE ASSIGNMENTS, OF CORNELIUS ST. JOHN.

*Letters Patent No.* 48,632, *dated July* 4, 1865; *reissue No.* 3,458, *dated May* 25, 1869.

IMPROVEMENT IN LAMP-SHADES.

The Schedule referred to in these Letters Patent and making part of the same.

*To all whom it may concern:*

Be it known that CORNELIUS ST. JOHN, of Boston, in the county of Suffolk, and State of Massachusetts, has invented a new Improvement in Lamp-Shades; and I do hereby declare the following, when taken in connection with the accompanying drawings, and the letters of reference marked thereon, to be a full, clear, and exact description of the same, and which said drawings constitute part of this specification, and represent, in—

Figure 1, a top view;

Figure 2, a side elevation; and in

Figure 3, a vertical section.

This invention relates to an improvement in shades which are designed to be placed over the flame or chimney of a lamp, the object being to protect the inside of the shade from the effect of the heat of the flame, and also to construct the shade so that portions of it may be turned up to permit the free passage of light, or to vary the extent of the shaded space. To this end, The invention consists first, in lining the inside of the shade with mica, which not only prevents injury to the shade from the heat of the flame, but greatly improves the same as a reflecting-surface; second, in hinging the different sides of the shades, so that either one or all may be raised so high as to permit the free passage of light thereunder, or so as to expand the space shaded.

To enable others to construct and use this improvement, I will fully describe the same as illustrated in the accompanying drawings.

A is the upper part of the shade, of any desired form, and provided with a supporter, B, or other apparatus, for holding the shade upon the lamp or over the flame.

The interior surface is lined with a plate of mica, *a*. This, in paper shades, prevents the burning of the paper, and in other shades prevents injury from the heat derived from the flame of the burner.

The fixed part A may be of any desirable height, but should be of sufficient diameter and of suitable construction to permit the hinging thereto of the different sides C, as seen in the drawings, and the hinge by which the lower parts are secured should be of such construction as to give sufficient friction in the hinge to sustain the sides to any desired angle.

The object of this is, that when it is desired to expand the extent shaded, the sides, one or more, may be raised accordingly, and by raising the folded sides, or either of them, above a horizontal position, then upon the side or sides which are raised the light will pass out unobstructed.

The sides may be of any desirable number, and are constructed so that they may be turned down, to close entirely around the flame, and permit no light to pass out except below the edge of the shade.

Having fully described this invention,

What I claim as the invention of CORNELIUS ST. JOHN, and desire to secure by Letters Patent, is—

1. In a lamp-shade, hinging the several sides, so that they may be turned upon their respective hinges, to operate in the manner substantially as herein set forth.

2. The combination of the pyramidal lamp-shade A and the series of reflectors C C, &c., arranged and applied to it, substantially as and so as to operate as specified.

3. The pyramidal shade, as made with the heat-resisting and reflecting lining and the adjustable reflectors, arranged substantially as specified.

CARLOS B. CURTISS.

Witnesses:

WAKEMAN W. WELLS,

ELIPHALET B. STEVENS.